United States Patent [19]

Buning et al.

[11] 4,185,048

[45] Jan. 22, 1980

[54] POLYVINYL CHLORIDE OF HIGH IMPACT STRENGTH PREPARED ON THE BASIS OF ETHYLENE-VINYL ACETATE OR ETHYLENE-ALKYLACRYLATE COPOLYMERS

[75] Inventors: Robert Buning, Troisdorf-Sieglar; Franz Blaschke, Witten; Werner Trautvetter, Troisdorf-Spich, all of Fed. Rep. of Germany

[73] Assignee: Dynamit Nobel Aktiengesellschaft, Troisdorf, Fed. Rep. of Germany

[21] Appl. No.: 927,182

[22] Filed: Jul. 24, 1978

Related U.S. Application Data

[63] Continuation of Ser. No. 767,924, Feb. 11, 1977, abandoned, which is a continuation of Ser. No. 573,206, Apr. 30, 1975, abandoned.

[30] Foreign Application Priority Data

May 7, 1974 [DE] Fed. Rep. of Germany ....... 2421900

[51] Int. Cl.$^2$ ............................................. C08L 51/00
[52] U.S. Cl. ..................................................... 525/80
[58] Field of Search ............................ 260/897, 876 R

[56] References Cited

U.S. PATENT DOCUMENTS

| 3,358,054 | 12/1967 | Hardt et al. | 260/878 |
| 3,517,083 | 6/1970 | Salyer | 260/878 |

FOREIGN PATENT DOCUMENTS

| 924457 | 4/1963 | United Kingdom | 260/897 |
| 1027710 | 4/1966 | United Kingdom | 260/876 R |

*Primary Examiner*—Carman J. Seccuro
*Attorney, Agent, or Firm*—Sprung, Felfe, Horn, Lynch & Kramer

[57] ABSTRACT

Polymer blend of:
(a) 4–15 wt.% of a graft polymer composed of 5–70 wt.% of vinyl chloride grafted in the gel phase, onto 95–30 wt.% of a copolymer of ethylene and vinyl acetate or ethylene and alkyl acrylate, said copolymer being 2.5–15 wt.% of vinyl acetate or alkyl acrylate and 97.5–85 wt.% of ethylene,
(b) 96–85 wt.% of polyvinyl chloride polymer which is at least one of polyvinyl chloride homopolymer and vinyl chloride copolymer.

The blend has high impact strength.

1 Claim, No Drawings

POLYVINYL CHLORIDE OF HIGH IMPACT STRENGTH PREPARED ON THE BASIS OF ETHYLENE-VINYL ACETATE OR ETHYLENE-ALKYLACRYLATE COPOLYMERS

This is a continuation of application Ser. No. 767,924, filed Feb. 11, 1977, which is a continuation of application Ser. No. 573,206, filed Apr. 30, 1975, both now abandoned.

BACKGROUND

Copolymers of ethylene and vinyl acetate (EVA) are known as agents for improving the impact strength of polyvinyl chloride plastics. The impact strength improving action of the EVA copolymers is dependent upon the vinyl acetate content in the copolymer and on the molecular weight (D. Hardt in Br. Polym. J. 1969, Vol. 1, September, pages 225–232). The molecular weight of the EVA copolymer must be above the minimum of approximately 5000 in order for it to have an impact strength improving action. Nevertheless the vinyl acetate content of the EVA copolymer is of decisive importance to impact strength and especially the U-shaped notch impact toughness. The optimum content of the vinyl acetate is 45% by weight.

Above or below this content of 45% vinyl acetate (VA), much lower U-shaped notch impact toughnesses are obtained in the PVC thus compounded; at 28% and 65% vinyl acetate by weight, standardized to identical quantities of added EVA copolymer, the U-notch impact toughness (DIN 53,453) is only slightly better than that of PVC alone. At contents below 20 wt.-% VA, the U-notch toughness of the plain PVC is not improved, and the impact strength may even fall below that of plain PVC. Hardt bases the necessity of the described relationship on the physical properties of the EVA copolymers, especially their elasticity in relation to their vinyl acetate content.

Quite similar findings have also been made with regard to the impact strength improving action of ethylenealkylacrylate copolymers and their acrylate content.

Remarkably, even in the case of graft copolymers formed by grafting vinyl chloride onto these above-named EVA copolymers, the same relationships manifest themselves, and a pronounced optimum of the elastification, especially as regards the U-notch toughness, occurs at contents of approximately 45 wt.-% VA in the basic EVA polymer of the graft polymers.

THE INVENTION

Contrary to this knowledge from the state of the art, it has now been found that graft polymers formed by grafting vinyl chloride onto EVA copolymers having low and very low vinyl acetate contents and onto corresponding ethyleneacrylate copolymers impart good elasticity to polyvinyl chloride.

Indeed, it has been found that ethylene-vinyl acetate copolymers and ethylene-acrylate copolymers having a high ethylene content, e.g., between 85 and 97.5% by weight, have an excellent ability to improve the impact strength of PVC if vinyl chloride is grafted onto them in the gel phase.

In this kind of graft copolymerization, the vinyl chloride together with the catalyst penetrates into the copolymer without dissolving the latter and becomes copolymerized by grafting onto the copolymer in the solid phase.

The subject matter of the invention is high impact strength polyvinyl chlorides on a basis of copolymers of ethylene and vinyl acetate or copolymers of ethylene and alkyl acrylate, characterized by a polymer mixture composed of conventional additives plus up to 96 wt.-% of polyvinyl chloride and/or vinyl chloride copolymers and 4 to 15 wt.-% of a graft polymer composed of a copolymer of ethylene with 2.5 to 15 wt.-% of vinyl acetate or alkyl acrylate as the basic polymer and 5 to 70 wt.-% of vinyl chloride grafted onto the copolymer in the gel phase.

The ethylene-vinyl acetate and ethylene-alkyl acrylate copolymers used in accordance with the present invention are to contain between 5 to 70%, by weight, of vinyl chloride, preferably between 10 to 60 wt.-%, grafted on. When mixed with PVC or VC copolymers, these graft copolymers yield high impact strength PVC compositions. The impact strength of these PVC compositions will depend on the quantity and nature (chlorine content and molecular weight) of the graft copolymer and on the conditions of fabrication.[1] For the achievement of good impact strengths, especially below room temperature or in low temperature applications, graft polymer contents between 4 and 15%, by weight, are necessary. In general, contents between 5 and 12%, by weight, give good results.

[1] Suitably fabricating conditions are indicated in the examples. As is usual in the art, for a particular composition, the appropriate conditions can readily be determined by experiment.

When vinyl chloride copolymers are contained in the mixture instead of PVC or in addition thereto, they can be the conventional VC copolymers which are made into molding compositions and in which usually up to about 15 wt.-%—rarely up to about 40 wt.-%—of a monoethylene monomer has been copolymerized with vinyl chloride.

The graft polymer and PVC or VC copolymer are worked by compounding together with additives to form a polymer composition. Taking the amount of PVC, graft polymer, and additive as 100%., the additives are present in the small, conventional amounts ranging from about 2% to a maximum of 10%, by weight. To these tested additives, which are necessary in part to facilitate fabrication and in part for the finishing of the product, or which are desirable in particular cases, such as lubricants, heat stabilizers, decomposition stabilizers, and ultraviolet stabilizers, may be added additional adjuvants such as small amounts of active fillers (which are in addition or the 2% or 10%).

The conditions prevailing during the preparation and fabrication of the compositions are subject, as it is known, to certain requirements. While the components are being mixed in the softened, thermoplastic state, for example in a roller mixer at temperatures ranging between about 150° and about 195° C., it is necessary to avoid not only inhomogeneities due to an insufficient number of passes through the rolls, insufficient rolling time and insufficient heat, but also the danger of "dead rolling" by excessively protracted and intense mixing action or damage by excessively high temperatures. The same applies to the subsequent working of the roll skin by further rolling, pressing, etc. The best values of the impact strength and U-notch toughness are to be determined along with other mechanical characteristics by testing by methods well known in the art, by they are indicated by the data given in the Examples. Special attention is to be given to the quantity and chlorine content of the graft polymer, increasing graft polymer contents generally necessitating higher working temperatures, and increasing chlorine content, i.e., an increasing content of the vinyl chloride grafted on, generally necessitating lower working temperatures.

The preparation of the graft polymers is performed in a relatively simple manner, since the easily ground ethylene copolymers can be ground at room temperature to powders which are added to the polymerization mixture directly before starting the graft polymerization. The time-consuming dissolution of the basic polymer in the monomeric vinyl chloride, which is necessary in many graft polymerization processes, is not required in the method involved here of grafting in the gel phase.

There is a special advantage in the fact that ethylene copolymers having the high content of at least about 85 wt.-% of ethylene, which are commonly prepared by highpressure polymerization, are very easily available and do not have the sticky, viscous consistency which makes it so difficult to handle numerous ethylene copolymers. such as the EVA copolymers having low ethylene contents, of the order of 50% for example.

The molecular weights of the ethylene copolymers are to be between 5000 and 150,000, and they are increased correspondingly by the amount of vinyl chloride grafted on. Said molecular weight is determined by gel permeation chromatography.

The graft polymerization performed in the gel phase is characterized by the fact that the basic polymer as well as the graft polymer that is prepared is always in the solid phase. The grafting-on of the vinyl chloride is accomplished by the fact that monomeric vinyl chloride together with the catalyst enters into the basic polymer and polymerizes therein. It is in this manner that the conditions of the polymerization are produced. The grafting generally is performed directly on the granules of the EVA without other adjuvants, no substances being present in the polymerization autoclave (which is operated at temperatures appropriate to thermal polymerization) other than the basic polymer, vinyl chloride, and a catalyst which is soluble in the organic phase, in much the same manner as in a polymerization in the mass.

However, in addition to the substances named, water and emulsifiers or suspension stabilizers, small amounts of organic solvent, regulators if desired, etc., can be added. Suitable catalysts are, for example, dialkyl peroxides such as dilauroyl peroxide or dicyclohexylperoxide, azo compounds such as azoisobutyronitrile, or also the peroxydicarbonates, in conventional amounts. Good graft polymerization speeds are achieved with these catalysts at temperatures between 30° and about 90° C. The known catalysts for the polymerization are used.

Appropriate stirring mechanisms, such as ribbon stirrers or peripheral or shearing-action stirrers, are desirable.

If copolymers formed from ethylene and alkyl acrylates are used as basic polymers, those having alkyl groups of one to eight carbon atoms, both straight-chained and branched, are preferred, examples being butyl acrylate as well as the ethyl butyl acrylates and ethyl hexyl acrylates.

The graft polymers thus prepared have an excellent compatibility with polyvinyl chlorides of many different types, having the customary K values, so that, if desired, amounts even in excess of 15% can easily be incorporated into PVC. Remarkably, the impact strength improving action is peculiar only to the graft polymers, while the basic polymers with which they are combined are themselves ineffectual, as is indicated in the examples for purposes of comparison by U-notch toughnesses ranging from 2 to 4 kp/cm$^2$; these, in conjunction with the measurements of the impact toughness given as "broken" or "unbroken" (the latter indicating an impact toughness above 150 kp/cm$^2$), show that the PVC has not been sufficiently elasticized or toughened. The compositions of the invention have a U-notch toughness (DIN 53,453) of at least about 15, usually at least about 18, and an impact strength (DIN 53,453) of at least 150 kp/cm$^2$.

It has furthermore been found surprisingly that a sufficient effectiveness of the graft polymers is associated with a maximum ethylene content in the basic polymer of about 97 or 97.5%, by weight.

As indicated by Example 12, a graft polymer on the basis of a polyethylene (trademark name "Lupolen") prepared by appropriate high-pressure polymerization has an insufficient elasticizing and toughening action, as indicated by the modest values of the notch toughness and to some extent even impaired other mechanical values, the same as in the case of the ungrafted polyethylene of Example 11, also given for purposes of comparison.

Herein the percentages for the graft polymer -PVC (or VC copolymer) composition are on the basis of those components making up 100 wt.%. Similarly, the percentages for the components of the graft polymer are on the basis of the graft polymer being 100%. Where the composition of a polymer (graft polymer or copolymer) is given, the percentages are based on the monomers corresponding to the polymer.

EXAMPLES

Examples are given hereinbelow of the preparation of the graft polymers in the gel phase.

Examples of the high impact strength polyvinyl chloride are contrasted herein with examples given for purposes of comparison, in which identical amounts of the ethylene copolymer on which the graft polymers are based were used, as indicated by the same vinyl acetate or alkyl acrylate content.

In Tables 2 and 3, the second column indicates this vinyl acetate or alkyl acrylate content in the basic polymer of the graft polymer, or of the copolymer in the case of the examples given for comparison.

The third column lists the chlorine content of the graft polymers on the basis of the amount of vinyl chloride grafted on, chlorine levels of around 14% indicating an amount of about 25 wt.-%, and chlorine levels of around 28.5% corresponding to an amount of about 50 wt.-% of graftedon PVC in the graft polymer.

(A) Preparation of a graft polymer on the basis of an ethylene-vinyl acetate copolymer containing 7.5 wt.-% of vinyl acetate and a molecular weight of 26,000 (measured in the osmometer in o-dichlorobenzene at 85° C.):

In a 30-liter steel autoclave flooded with nitrogen and equipped with a ribbon mixer operating along the periphery, 3,300 g of Alkathene VJF 502 copolymer (a commercial product of ICI) in granular form, and 21 g of dilauroyl peroxide are placed. The ribbon mixer is operated at 100 rpm and the temperature is set at 60° C. After 2 hours of reaction time the temperature is lowered to 40° C., and after another 15 minutes the excess vinyl chloride is purged off. 4.4 kg is obtained of a graft copolymer having a chlorine content of 13.8% by weight.

The graft copolymer is soluble in hot tetrahydrofuran, i.e., it is not cross-linked. The molecular weight is about 55,000. No vinyl chloride homopolymer can be detected in the graft polymer.

Similar results are obtained if an EVA copolymer containing 3 wt.-% of vinyl acetate (Lupolen V 2524 EX, a commercial product of BASF) or an EVA copolymer containing 13 wt.-% of vinyl acetate (Lupolen V 3510 K, a commercial product of BASF) is used as the basis for grafting, or if 3,300 g of a copolymer composed of 97 wt.-% ethylene and 3 wt.-% n-butyl acrylate is used.

Under the above-stated conditions, the above-stated amounts then yield graft polymers having chlorine contents of about 13.4 to 14.0 percent by weight, and consequently containing approximately 25 weight-percent of vinyl chloride grafted on.

(B) Preparation of a graft copolymer containing a high percentage of PVC.

In a one-liter glass autoclave equipped with a ribbon mixer, the air is displaced with nitrogen, and then 402 ml of desalted water, 38 ml of an aqueous solution of 3% methyl cellulose by weight, 99 g of an EVA copolymer containing 7.5 wt.-% of copolymerized vinyl acetate (as powder, obtained by grinding granules in the cold), 121 g of vinyl chloride and 0.85 g of dilauroyl peroxide are put in. The temperature is adjusted to 55° C. After 5 hours of polymerization, 198 g of graft copolymer is obtained in powder form having a chlorine content of 28.4 wt.-%, and therefore a grafted-on vinyl chloride content of the order of 50% by weight.

As graft polimerization in gel phase is meant a process wherein the basis-polymer—in this case the copolymer of ethylene and 2,5–15% of vinyl acetate or alkyl acrylate—is present in solid phase during the polymerization and is not solved or dispersed, nor in the monomer nor in a solvent or dispersion medium. The vinyl chloride to be grafted onto the basis-polymer is absorbed and dispersed in the inner of this basis-polymer together with the catalyst and thus being polymerized there to form a graft polymer of intimate dispersion of basis-polymer and polymer being grafted there upon.

In general 0,001–5 wt,% of a peroxidic catalyst is present, a relatively low pressure of the autoclave*1 to 20 at is effected and temperature of 10° to 80° C. are usual.
* of As active fillers are meant very finely dispersed fillers which can influence the characteristics of the polymer product, similar like furnace black has an active and valuable influence on the characteristics of tires etc.

EXAMPLE 1

Preparation of high impact-strength PVC sheet material on the basis of EVA-vinyl chloride graft polymers having a content of 13% vinyl acrylate in the EVA copolymer and vinyl chloride grafted thereon in the gel phase, chlorine content 13.8% (as per Example A):

270 g of PVC of the suspension type having a K value of 68 (dry blend type) is mixed with 30 g of EVA graft polymer, 6 g of 17 M stabilizer (dibutyl tin mercaptide) and 1.5 g of E-Wachs (low-molecular-weight polyethylene) in a roller mixer at a temperature of 180° C. for 15 minutes to form a roll skin. The roll skin is pressed for 4 minutes while still hot, at a temperature of 185° C., to form a pressed sheet material 4 mm thick. Standard stick specimens are sawed from the 4-mm sheet and the impact strength and U-notch toughness pursuant to DIN No. 53,453 are determined.

In Table 1 are given the values for the grafted and ungrafted material.

Table 1

| Additive | U-notch toughness, kp/cm$^2$ | Impact strength kp/cm$^2$ |
|---|---|---|
| 10 wt.% of grafted EVA | 35.5 | unbroken |
| 10 wt.% of plain EVA for comparison | 3.8 | broken |

The grafted material bring about a substantial improvement of the mechanical characteristics of the polyvinyl chloride. This is surprising, and on the basis of available knowledge was not to be expected. The mechanical characteristics and stated test values are dependent upon the composition of the graft polymer and on the stated fabricating conditions, especially the working temperature.

Ungrafted material—in this case the copolymer formed of ethylene and 13 wt.-% of vinyl acetate—when used as an additive to the PVC, brings about a reduction of the mechanical values. During fabrication it concentrates at the surface and leads to sticking and smearing of the rolls and press. It has little impact strength and is not at all usable.

EXAMPLES 2 TO 12

In the same manner as in Example 1, sheet materials are prepared containing 10% by weight of graft polymers of various composition in PVC (K value 68). Table 2 lists the U-notch toughnesses and impact strengths in relation to the rolling and pressing temperatures, to the vinyl acetate content of the EVA polymers, and to the chlorine content of the graft polymer. For purposes of comparison, the same EVA copolymer is given in each case, also compounded in the amount of 10 wt.-% with the same PVC.

The molecular weights of the graft polymers used range from 20,000 to 60,000.

The rolling conditions are the same with regard to the approximately 15 minutes of rolling time as those in Example 1, but only those rolling temperatures (temperature of the rolls) and press temperatures are given which in each case produce the best product characteristics, especially the best U-notch toughnesses.

Table 2

| Example | VA wt. % in the copolymer | % Cl in the graft polymer | Rolling temp. °C. | Press temp. °C. | U-notch toughness, kp/cm$^2$ | Impact strength kp/cm$^2$ |
|---|---|---|---|---|---|---|
| 2 | 13.0 | 13.8 | 180 | 185 | 35.5 | n.g. = unbroken |
| 3 (Comparison) | 13.0 | 0.0 | 180 | 185 | 3.8 | g. = broken |
| 4 | 13.0 | 28.4 | 170 | 175 | 20.8 | n g. |
| 5 (Comparison) | 7.5 | 0.0 | 180 | 185 | 3.4 | g. |

Table 2-continued

| Example | VA wt. % in the copolymer | % Cl in the graft polymer | Rolling temp. °C. | Press temp. °C. | U-notch toughness, kp/cm$^2$ | Impact strength kp/cm$^2$ |
| --- | --- | --- | --- | --- | --- | --- |
| 6 | 7.5 | 14.1 | 180 | 185 | 36.0 | n.g. |
| 7 | 7.5 | 28.8 | 175 | 180 | 22.4 | n.g. |
| 8 (Comparison) | 3.0 | 0.0 | 185 | 190 | 2.5 | g. |
| 9 | 3.0 | 13.5 | 185 | 190 | 30.3 | n.g. |
| 10 | 3.0 | 28.3 | 175 | 180 | 18.8 | n.g. |
| 11 (Comparison) | 0.0 | 0.0 | 185 | 190 | 1.8 | g. |
| 12 (Comparison) | 0.0 | 28.6 | 185 | 190 | 6.4 | n.g. |

Table 2 shows that the graft polymerization in the gel phase transforms EVA copolymers of low vinyl acetate content (even as low as 3 wt.-% for example) into impact strength improving components for polyvinyl chloride. If the vinyl acetate content is zero, i.e., in the case of polyethylene or its graft polymers, this effect is obtained to only a very low degree.

EXAMPLES 13 TO 21

As in Example 1, sheet material is prepared from 7 weight-percent of a graft copolymer formed by grafting vinyl chloride onto an ethylene-n-butylacrylate copolymer (molecular weights 25,000 to 65,000). The results are given in Table 3.

TABLE 3

| Example | Acrylate wt. % | % Cl | Roll temp. °C. | Press temp. °C. | U-notch toughness kp/cm$^2$ | Impact strength kp/cm$^2$ |
| --- | --- | --- | --- | --- | --- | --- |
| 13* | 14.0 | 0.0 | 170 | 175 | 3.5 | unbroken |
| 14 | 14.0 | 14.1 | 170 | 175 | 38.6 | unbroken |
| 15 | 14.0 | 28.1 | 170 | 170 | 28.5 | unbroken |
| 16* | 6.5 | 0.0 | 175 | 180 | 3.2 | broken |
| 17 | 6.5 | 14.0 | 175 | 180 | 35.6 | unbroken |
| 18 | 6.5 | 26.8 | 170 | 175 | 28.6 | unbroken |
| 19* | 3.0 | 0.0 | 180 | 185 | 1.6 | broken |
| 20 | 3.0 | 13.8 | 180 | 185 | 35.8 | unbroken |
| 21 | 3.0 | 27.8 | 175 | 180 | 25.6 | unbroken |

*Examples given for purposes of comparison, only.

Table 3 shows that graft polymers made from copolymers with acrylates have advantages over those made with vinyl acetate (cf. Table 2). On the other hand, they have improved weather resistance in comparison with graft copolymers made from ethylene copolymers containing vinyl acetate.

Similar results are obtained on the basis of copolymers of ethyl-n-hexylacrylate.

What is claimed is:
1. A polymer blend of:
   (a) 4-15 wt.% of a graft polymer composed of 5-70 wt.% of vinyl chloride grafted in the gel phase, onto 95-30 wt.% of a copolymer of ethylene and vinyl acetate or ethylene and alkyl acrylate, said copolymer being 2.5-15 wt.% of vinyl acetate or alkyl acrylate and 97.5-85 wt.% of ethylene,
   (b) 96-85 wt.% of polyvinyl chloride polymer which is at least one of polyvinyl chloride homopolymer and vinyl chloride copolymer.

* * * * *